United States Patent
Isobe et al.

(10) Patent No.: US 6,295,483 B1
(45) Date of Patent: Sep. 25, 2001

(54) AUTOMATIC MDF (MAIN DISTRIBUTION FRAME) APPARATUS

(75) Inventors: Hitoshi Isobe; Masahiro Ito; Takashi Murakami, all of Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/245,819

(22) Filed: Feb. 5, 1999

(30) Foreign Application Priority Data

Jul. 10, 1998 (JP) .................................. 10-195214

(51) Int. Cl.⁷ .................................................. G06F 19/00
(52) U.S. Cl. ............... 700/245; 318/568.12; 318/568.14; 318/568.16; 318/560; 318/569; 701/23; 29/739; 29/740; 29/741; 29/742; 29/743; 29/744
(58) Field of Search .............................. 700/245; 701/23; 318/568.12, 568.14, 568.16, 560, 569, 561; 439/48, 75, 45, 46; 361/803; 385/17, 16, 25, 135, 20, 63, 137, 22, 71, 19; 29/739, 740–744

(56) References Cited

U.S. PATENT DOCUMENTS

| | | | |
|---|---|---|---|
| 5,017,145 | * 5/1991 | Kanai et al. | 439/45 |
| 5,204,921 | * 4/1993 | Kanai et al. | 385/17 |
| 5,386,485 | * 1/1995 | Saito et al. | 385/22 |
| 5,446,810 | * 8/1995 | Watanabe et al. | 385/22 |
| 5,504,825 | * 4/1996 | Saito et al. | 385/17 |
| 5,581,644 | * 12/1996 | Saito et al. | 385/17 |
| 5,613,021 | * 3/1997 | Saito et al. | 385/17 |
| 5,661,826 | * 8/1997 | Saito et al. | 385/17 |
| 5,790,651 | * 8/1998 | Suzuki et al. | 379/327 |
| 5,865,630 | * 2/1999 | Nakano | 439/48 |
| 5,870,528 | * 2/1999 | Fukuda | 700/245 |
| 5,975,913 | * 11/1999 | Wada et al. | 439/45 |
| 5,994,862 | * 11/1999 | Ejiri et al. | 318/568.12 |
| 6,138,345 | * 10/2000 | Suzuki et al. | 29/739 |

FOREIGN PATENT DOCUMENTS

| | | |
|---|---|---|
| 4-118993 | 4/1992 | (JP) . |
| 09098452A | * 9/1992 | (JP) . |
| 404249993A | * 9/1992 | (JP) . |
| 4-332189 | 11/1992 | (JP) . |
| 06181584A | * 6/1994 | (JP) . |
| 09098451A | * 3/1997 | (JP) . |
| 11302732A | * 11/1999 | (JP) . |

OTHER PUBLICATIONS

Yoshida et al., A New Automated Main Distributing Frame System Using Robot, IEEE., pp. 0977–0982, 1991.*

Umenura et al., Design of High Density Pin Board Matrix Switches for Automated Main Distributing Frame System, IEEE., pp. 266–277, 1992.*

Kanai et al., High Density Pin Board Matrix Switches for Automated MDF Systems, IEEE., pp. 893–903, 1992*

Kanai et al., Automated Optical Main–Distributing–Frame System, IEEE., pp. 1986–1992, 1994.*

* cited by examiner

Primary Examiner—William A. Cuchlinski, Jr.
Assistant Examiner—McDieunel Marc
(74) Attorney, Agent, or Firm—Helfgott & Karas

(57) ABSTRACT

One matrix board aggregate accommodating two matrix boards is made one unit of a switch. Three of the matrix board aggregates are vertically located, groups of such three vertically-located matrix board aggregates are laterally located and robots are provided between the matrix board aggregates. By providing a number of robots, the switch operation speeds up. The robots are controlled by a control circuit/power supply RMC/POW. I/O cables for connecting an MDF apparatus to an exchange or to lines are provided at the back. In a three-stage switching configuration, by devising the location of primary, secondary and tertiary switches, interconnection between matrix board aggregates can be made using BWBs made of a printed wiring board.

10 Claims, 15 Drawing Sheets

<HOW TO MAKE A CONTACT>

- FORMS A SEPARATION THROUGHHOLE AT AN INTERSECTION OF MBS AND USES IT AS A CONTACT.
- WINDS A CONTACT SPRING AROUND A CONNECTION PIN MADE OF ENGINEERING PLASTICS.
- JOINS A/B WIRE IN LAYERS AT ONE INTERSECTION HOLE.

BY CONCENTRATING AND MOUNTING MB AGGREGATES FOR EACH SW STAGE AS SHOWN IN FIG. 6A AND MOUNTING I/O CONNECTORS AT THE UPPER BACK, THE SIZE OF BWBs CAN BE REDUCED AS SHOWN IN FIG. 6B.

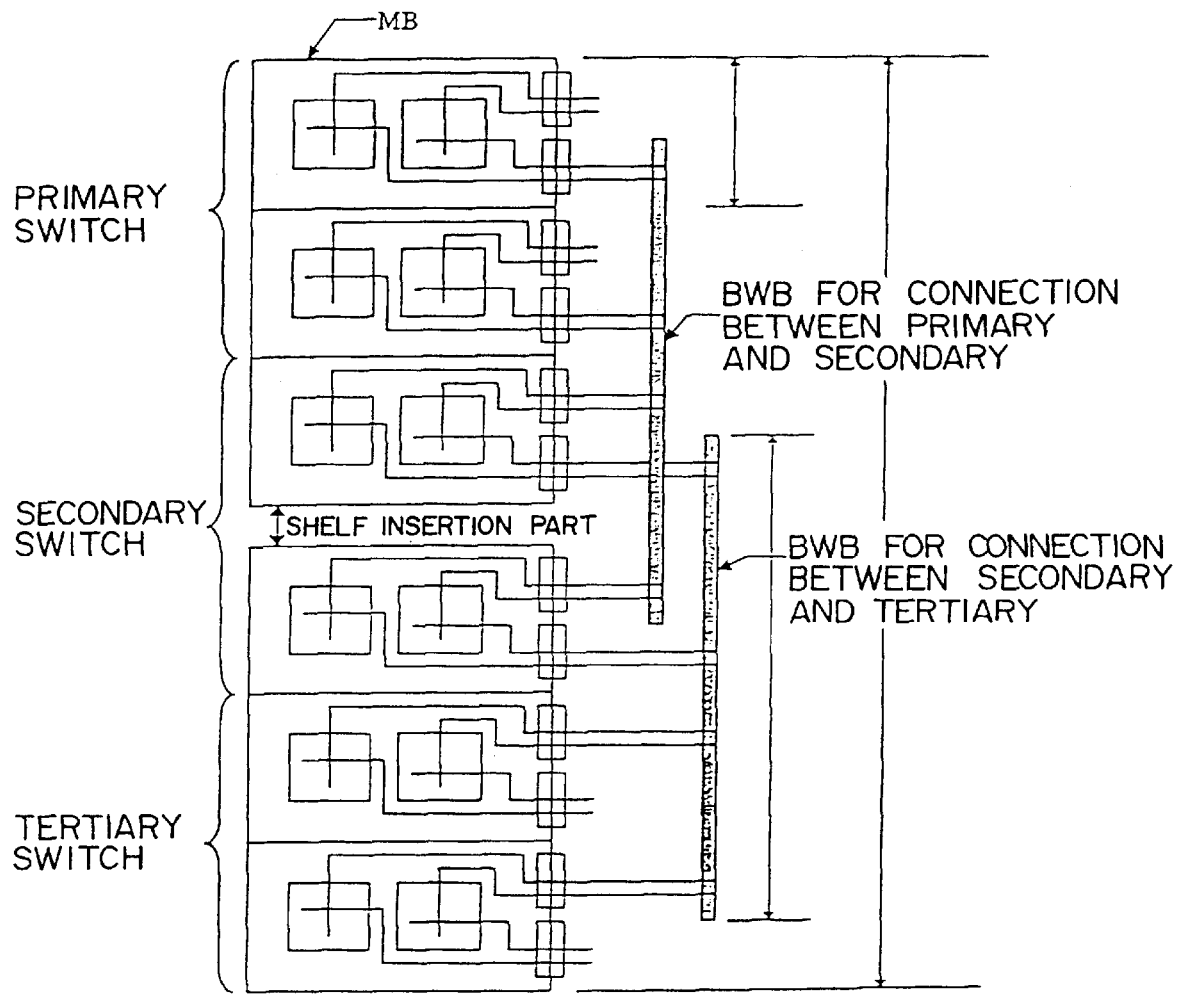
F I G. 12

AUTOMATIC MDF (MAIN DISTRIBUTION FRAME) APPARATUS

BACKGROUND OF THE INVENTION

1. Field of the Invention

The present invention relates to an automatic MDF apparatus used in an exchange.

2. Description of the Related Art

Recently, compact and light-weight exchanges as well as the high-density mounting of exchanges have been promoted. Along with these trends, the amount of cables connected to an MDF apparatus attached to an exchange has increased more and more. On the other hand, an automatic MDF apparatus in which robots automatically perform wiring or modify the combination of wires, has been invented and put into practical use. According to such an MDF apparatus, for example, every time a new subscriber wants to subscribe to an unattended telephone office, a new wiring and a modification in the combinations of wires can be automatically made.

FIG.1 shows a configuration of a first conventional automatic MDF apparatus.

In the configuration shown in FIG.1, a multi-layered printed wiring board in which wires are embedded horizontally and vertically, and at the points where wires cross, holes are opened, is made a basic unit of one switch. This basic unit of a switch is called a matrix board (MB). In this configuration, a number of matrix boards 121 are arrayed and mounted on both sides of the automatic MDF apparatus, and inside the automatic MDF apparatus robots 123 are provided to insert a pin in the hole of the matrix board 121 for short-circuiting wires. The robot 123 determines the rough position of the point by both a row sensor and a column sensor, and locates the precise position by applying a laser beam to a reference marker provided on the surface of the matrix board 121. When finding a position to insert a pin in this way, the robot 123 inserts the pin in the hole of the matrix board 121.

On the matrix board 121 a wiring pattern is formed, and wires cross with each other at the position of each hole. Therefore, when a pin for short-circuiting the wires is inserted by the robot 123, different wires are connected and a signal route is formed. By changing the position of inserting a pin, the connecting relation between the wires is modified, and a different signal route is formed. In this way, a signal coming from the telephone cable of a subscriber is switched over in the automatic MDF apparatus and inputted to an exchange located in a subsequent stage. In the configuration shown in FIG.1, since matrix boards 121 are provided on both sides of the automatic MDF apparatus, robots 123 inside the automatic MDF apparatus handle the matrix boards on both sides of the automatic MDF apparatus.

Today's MDFs adopt a three-stage switching configuration. If a signal route is switched over by a switch in a first stage, a signal is inputted to a switch in a second stage, and if the route is switched over again by a switch in the second stage, the signal is inputted to a switch in a third stage, and the signal outputted from the switch in the third stage is inputted to an exchange. As described earlier, when a new subscriber is accommodated in an exchange by laying a new piece of cable at the time of a new subscription or a relocation, an MDF is used to appropriately set up the signal route of the new subscriber and to accommodate the subscriber in the exchange. Although the change-over of a wiring route by a robot 123 does not occur so often and a high-speed change-over is not always required to rapidly switch over a wiring route, it is desirable that the change-over speed of the robot 123 is high.

FIG. 2 explains the connecting operation of wiring by inserting a pin in a hole of a matrix board using a robot.

As shown on the right of FIG. 2, wiring is made on the hashed part of the matrix board. Wires are embedded in four layers inside the matrix board. Usually, wires are laid in both x-axis and y-axis directions. At an intersection of the wires in both directions, a hole with a diameter of approximately 1 mm as shown on the left of FIG. 2 is made to cut a connection. Each of the output lines of the wires in the x-axis direction and in the y-axis direction are connected with another board or to an external cable through a connector unit (CN unit).

The left side of FIG. 2 shows how wires embedded in a matrix board are connected by a connection pin inserted by a robot, and is a cross section of the matrix board. As shown in FIG. 2, generally speaking, wires are laid in four layers, which are classified into two groups of A and B wire layers. These A and B wires layers correspond to the upward and downward lines of a telephone circuit. For example, if the A wire is upward line, the B wire is a downward line. The X and Y layers of each of the A and B wires correspond to the wires in the x-axis and y-axis directions shown on the right of FIG. 2. The connection pin is provided with a contact spring in the middle. When the connection pin is inserted in a hole, the X and Y layers are short-circuited, and a signal flows from an X layer to a Y layer or vice versa. Such a contact spring is provided for each of both A and B wire layers, for example, in such a way that if the upward line is connected, the downward line may also be connected simultaneously.

Generally speaking, although the connection pin is made of engineering plastic, the material is not necessarily limited to engineering plastic. The material of the contact spring is not also limited to a specific material, only one that has a sufficient electrical conductivity.

FIG. 3 shows a configuration of a matrix board in a second conventional automatic MDF apparatus.

In the configuration shown in FIG. 3, the size of the automatic MDF apparatus is reduced by locating matrix boards 140-1 through 140-4 and matrix boards 141-1 through 141-4 orthogonally to each other. The matrix boards 140-1 through 140-4 are located in parallel, and robots are provided between the matrix boards 140-1 through 140-4 to make the robots perform a switching work. The matrix boards 141-1 through 141-4 are also located in parallel and robots are provided between them. The matrix boards 140-1 through 140-4 and 141-1 through 141-4 are located orthogonally to each other, and are wired and connected at contacting points 142-1 through 142-4.

When the matrix boards are located in this way, as shown in FIG. 1, space can be used more effectively than when all the matrix boards are located only horizontally, and the volume occupied by the matrix boards can be reduced. As a result, the volume of the automatic MDF apparatus itself can be reduced.

FIG. 4 shows a configuration of a third conventional automatic MDF apparatus.

In the configuration shown in FIG. 4, matrix board units 154 in which a plurality of matrix boards are accommodated, are mounted on shelves, which are accommodated in a frame 150 of an automatic MDF apparatus. A robot 152 is composed of a support member consisting of an elevator 152c and an arm element 152*b*, and a head element 152*a* held by this support member. The head element 152*a* can move back and forth along the arm element 152*b*, and can also move to an arbitrary position in the matrix board unit 154 in conjunction with the left and right movement of the arm element 152*b* along the elevator 152*c*. When the robot is moved to another matrix board unit 154 to perform a switching work, the arm element 152*b* is moved to either of the left and right ends of the elevator 152*c*, and then the elevator 152*c* is moved up and down the frame 150. When the robot 152 comes to the target matrix board unit 154, the arm element 152*b* is moved laterally to a hole where the switching is to be performed. Such operations are controlled by a control circuit in a control package 160, and the power is supplied by a power supply unit 158.

The connection (link) between the matrix board units 154 is made by providing a connector on the side of each matrix board unit 154 and using a wiring harness, etc.

In the configuration shown in FIG.1, when a large-scale network is configure between the matrix boards of an MDF, both the required number of matrix boards and the number of holes per matrix board increases even if a three-stage switching configuration is adopted. As a result, the mounting area of matrix boards increases, and thereby the external dimensions of an automatic MDF apparatus also increase. Furthermore, when the external dimensions of an automatic MDF apparatus increase, the operation range of a robot also increases, which causes the following problems.

(1) Since the structure of a robot needs to be stiffened, the robot becomes heavy and large.
(2) While positioning in units of several tens of micrometers is required, an operation range of 1 to 2 m is needed, which is incompatible.
(3) When the operation distance to be travelled by a robot in one operation increases, as a result, the operation time also increases.

In the configuration shown in FIG. 3, when a large-scale network is configrued between the matrix boards of an MDF, the number of matrix boards increases. In this configuration, since a plurality of matrix boards 141-1 through 141-4 are connected to one side of each of matrix boards 140-1 through 140-4, the number of the matrix boards 141 increases, the size of each of matrix boards 140 must be increased. However, since the available size of a printed wiring board being the basic material of a matrix board is limited in terms of the production technology, in this configuration, MDFs with such a large-scale network configuration are not actually available. Furthermore, in this case, the location of cables connected to both line and exchange sides is restricted, the cables hinder the removal of robots, and work efficiency deteriorates.

In the configuration shown in FIG. 4, since links are formed using wiring harnesses, the number of links increases, the number of manufacturing processes increases, and when matrix boards are mounted on the apparatus, errors are easy to occur, since there are a lot of connectors between link wiring harnesses and matrix boards. Since an elevator mechanism the robots moves up and down, the mechanism to operate the robots becomes comparatively large, though the robots are small, and it is difficult to speed up the movement.

SUMMARY OF THE INVENTION

An object of the present invention is to provide an automatic MDF apparatus for implementing a large-scale network using a simple and work-efficient configuration.

The automatic MDF apparatus of the present invention comprises a plurality of matrix board aggregates accommodating a plurality of matrix boards including a matrix switch, which are first located vertically, and the group of a plurality of the vertically-located matrix board aggregates then are arrayed laterally inside a frame, and a plurality of robots for performing a switching work for the switches of the matrix board aggregate are provided between the plurality of arrayed matrix board aggregates and a back wired board made of a printed wiring board, for connecting the plurality of matrix board aggregates.

According to the present invention, since the matrix board aggregates are located in the same way as books are located on a book shelf, space where the matrix board aggregates are located, can be reduced. Since a plurality of robots are provided between the plurality of matrix board aggregates arrayed laterally, the switching work can be performed at high speed. Since the matrix board aggregates are interconnected not by cables but by the back wired board made of a printed circuit board, there is no wrong wiring and work efficiency is guaranteed. Furthermore, since by the use of a back wired board, space which would be occupied by cables when the matrix board aggregates are interconnected by cables, is not needed, the miniaturization of an automatic MDF apparatus can be realized.

BRIEF DESCRIPTION OF THE DRAWINGS

FIG. 12 is a cross sectional view showing a configuration to reduce a back wired board used in the configuration shown in FIG. 7.

DESCRIPTION OF THE PREFERRED EMBODIMENTS

Figure 1:
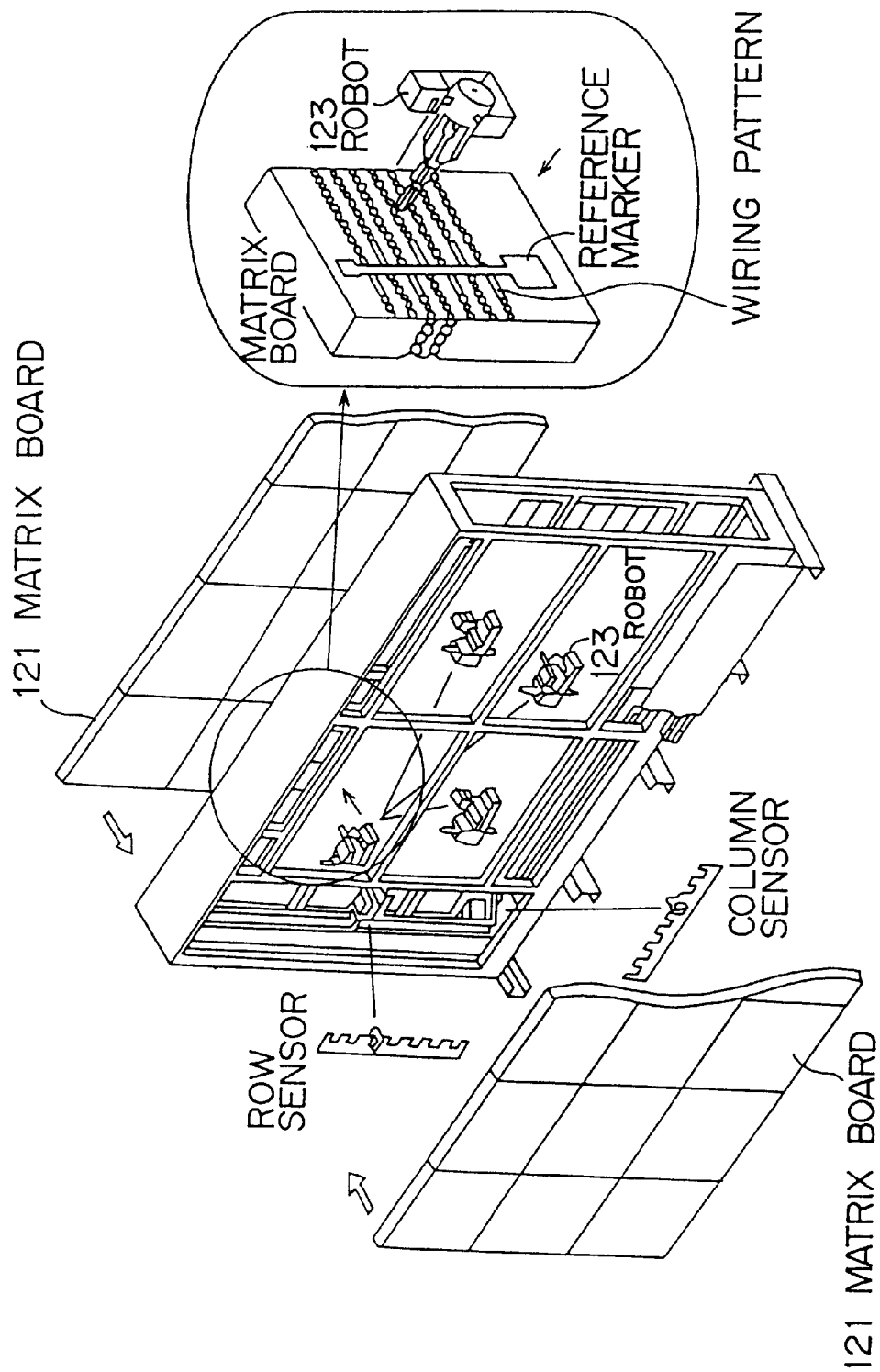
FIG. 1 shows a configuration of a first conventional automatic MDF apparatus.
Figure 2:
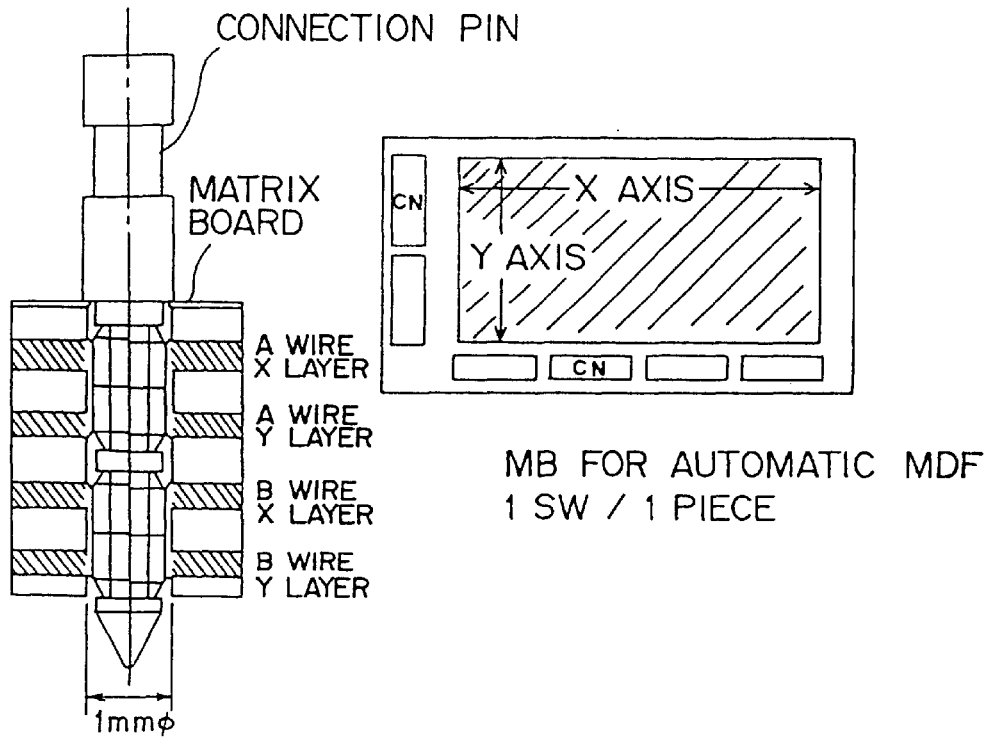
FIG. 2 explains the function of a wiring operation by inserting a pin in a hole of a matrix board using a robot.
Figure 3:
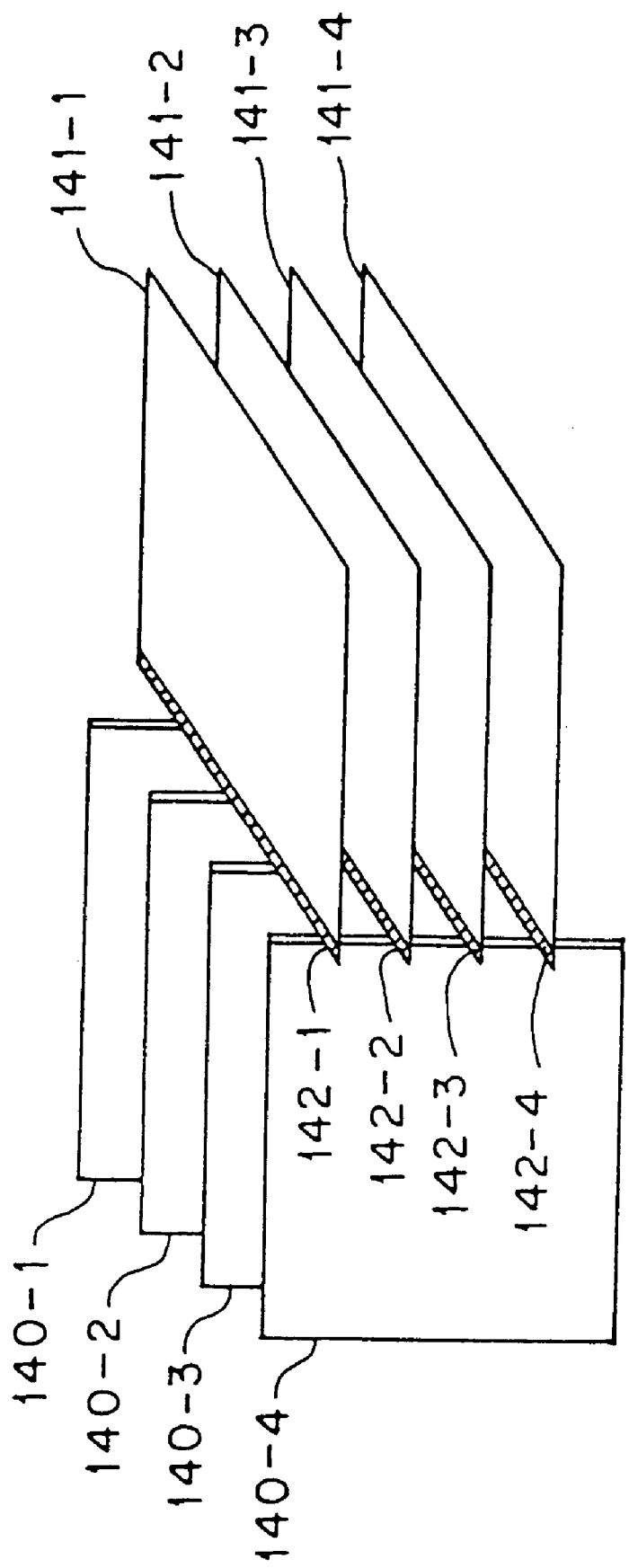
FIG. 3 shows a configuration of a matrix board in a second conventional automatic MDF apparatus.
Figure 4:
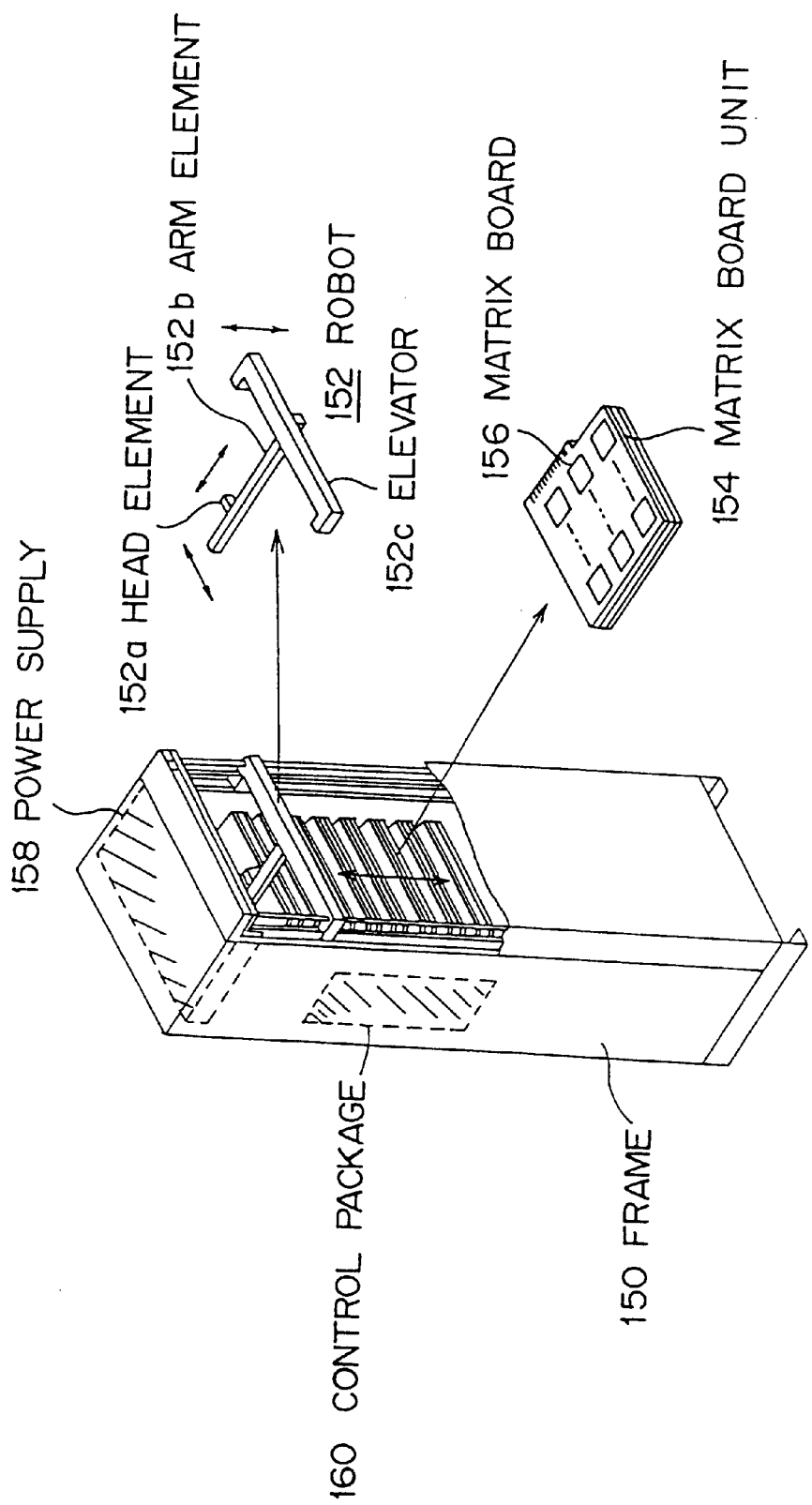
FIG. 4 shows a configuration of a third conventional automatic MDF apparatus.
Figure 5:
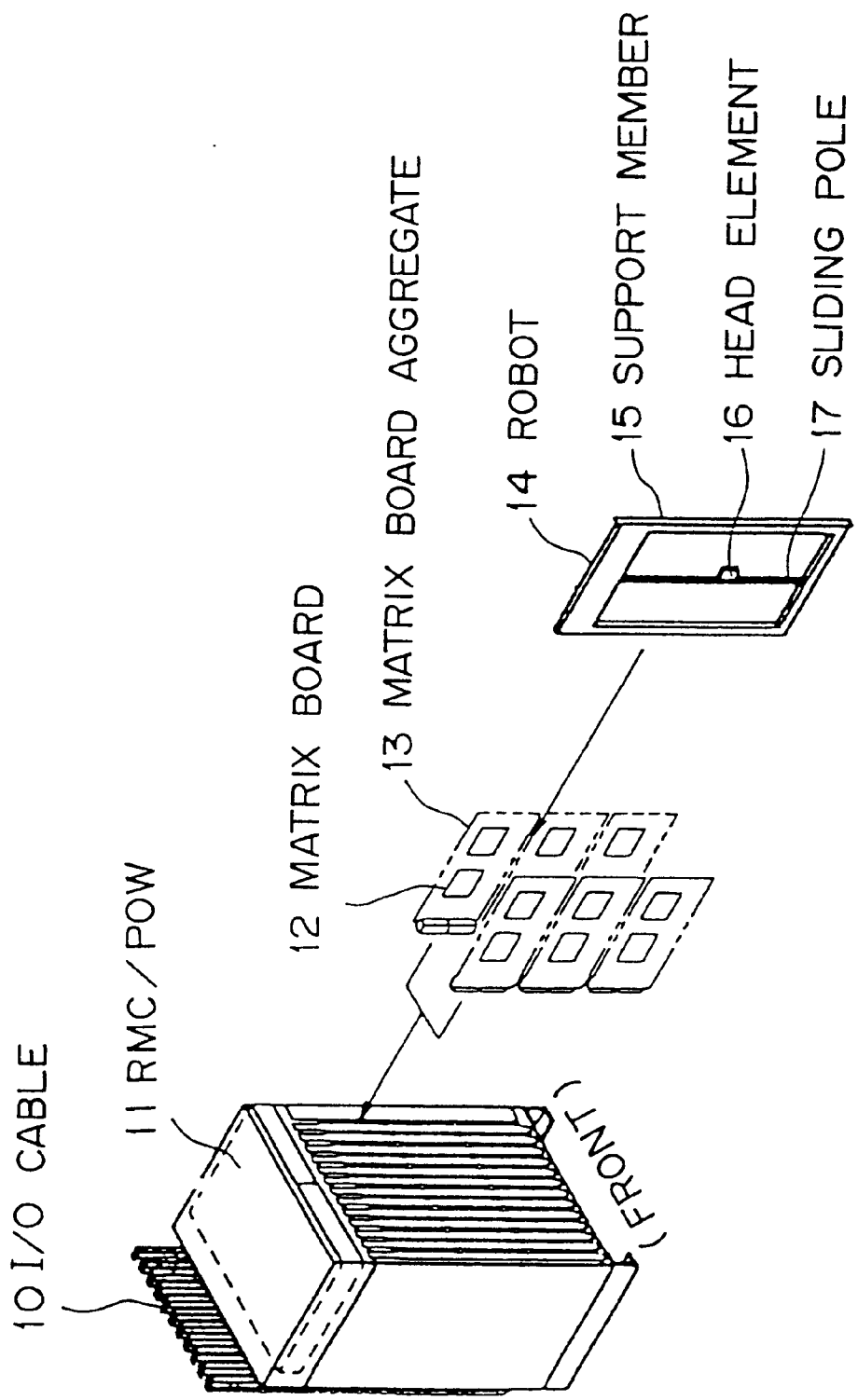
FIG. 5 shows the configuration of the embodiment of the present invention.

FIG. 5 shows the configuration of the embodiment of the present invention.

In this embodiment, a matrix board aggregate 13 accommodating two matrix boards 12 is made a constituent assembly. First, three of this matrix board aggregates 13 accommodating two matrix boards 12 are located vertically. Then, the group of the three vertically-located matrix board aggregates 13 accommodating two matrix boards 12, are arrayed laterally in a frame. A robot 14 comprises a square frame-shaped support member 15, a sliding pole 17 which is provided inside the support member 15 and slides along the top and bottom of the support member 15, and a head element 16 which is provided on the sliding pole 17, for inserting and extracting a connection pin. The head element 16 moves up and down along the sliding pole 17, inserts a connection pin in an arbitrary hole of the matrix switch of a matrix board 12 in conjunction with the movement of the sliding pole itself, and extracts a connection pin from an arbitrary hole thereof.

A matrix board means a board formed by embedding a matrix switch consisting of a hole in x and y wiring intersection points in it. A matrix board aggregate means a plurality of matrix boards mounted on one plate, which is made a unit of extension of switches.

The robot 14 is inserted in between the matrix boards located vertically. The number of the robots 14 is the same as that of the number of spaces between the matrix board aggregates, and a robot 14 is inserted in each space. Each robot 14 is controlled by a control circuit/power supply RMC/POW 11. At the back of the apparatus both a back wired board (BWB, described later) for interconnecting the matrix board aggregates 13 and I/O cables 10 for connecting the MDF apparatus to the outside, that is, to a line and an exchange, are provided.

Figure 6A:
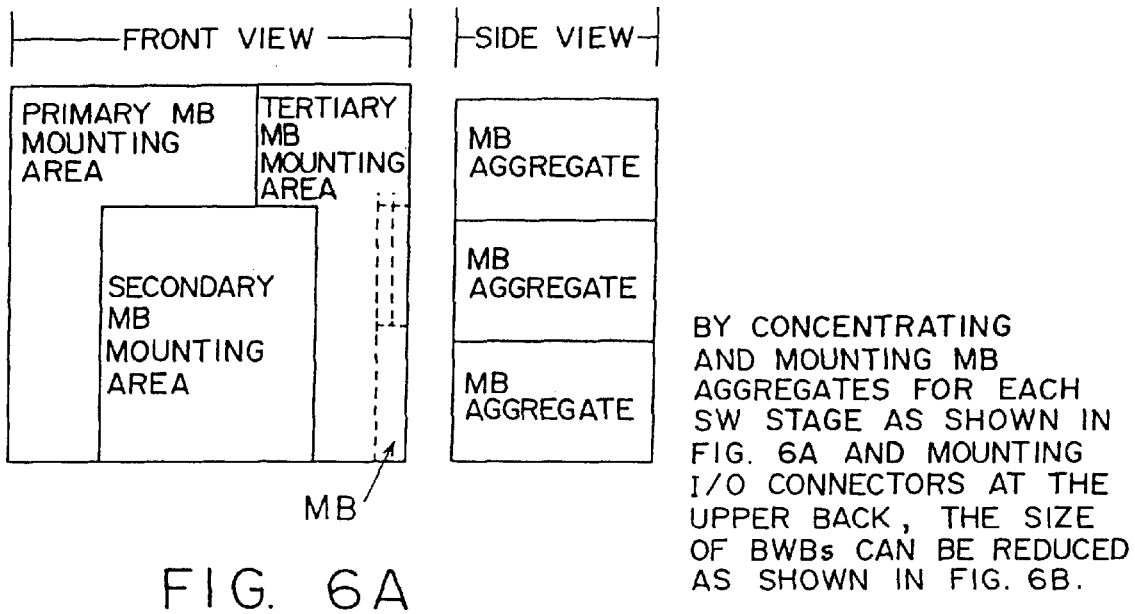
FIG. 6A shows how to arrange each switch in the embodiment shown in FIG. 5.
Figure 6B:
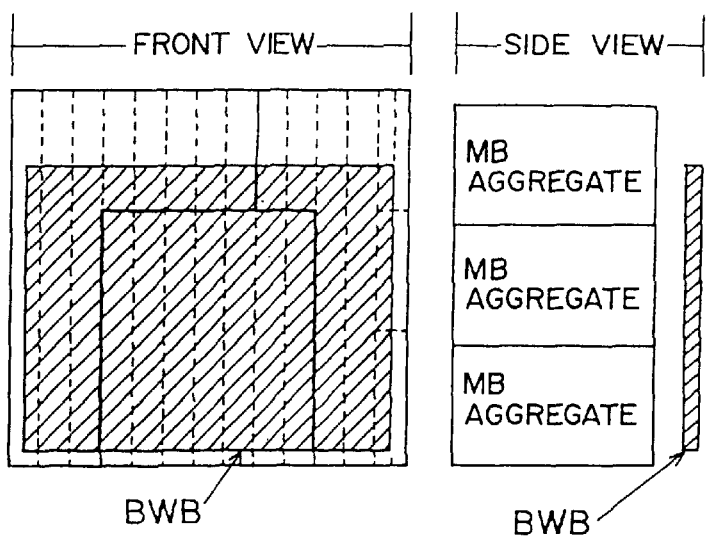
FIG. 6B is the back view of the MDF apparatus of the embodiment shown in FIG. 5 showing the location of a back wired board.

FIG. 6A shows how to arrange each switch in the embodiment shown in FIG. 5. FIG. 6B is the back view of the MDF apparatus of the embodiment shown in FIG. 5 showing the location of a back wired board.

As shown on the right of FIG. 6A, three matrix board aggregates are located vertically, and as shown on the left of FIG. 6A, the group of the vertically-located three matrix board aggregates are arrayed laterally. The MDF of this embodiment adopts a three-stage switching configuration, and switches in the first, second and third stages are called primary, secondary and tertiary switches, respectively.

In this embodiment, matrix boards accommodated in each matrix board aggregate are located as shown in FIG. 6A. That is, primary matrix boards are located on the upper left, tertiary matrix boards on the upper right, and secondary matrix boards in the lower center. The reason why the primary, secondary and tertiary matrix boards located in this way is because primary and tertiary matrix boards are provided with connectors for connecting the MDF apparatus to the outside, that is, to a line and an exchange, and the interconnection (link) between the matrix boards is not needed. On the other hand, all the connectors of the secondary matrix boards are used for the interconnection between the matrix boards. Therefore, by locating both the connectors of the primary matrix boards for connecting the MDF apparatus to the outside and those of the tertiary matrix boards for connecting the MDF apparatus to the outside in the upper portion, the connectors of the secondary matrix boards for interconnecting the matrix boards can be concentrated in the lower center.

FIG. 6B shows how a back wired board (BWB) with a wiring for interconnecting the matrix boards is located in the configuration shown in FIG. 6A.

As shown in FIG. 6B, since in the upper portion of the arrayed matrix board aggregates there is no connector for the interconnection between matrix boards, it is sufficient for the BWB to be provided only for parts excluding the upper part. Therefore, there is an advantage that a smaller size of a printed wiring board comprising the BWB can be implemented. By using printed wiring boards instead of cables for the interconnection between the matrix boards, connection work can be made easy to make, and simultaneously the size of an MDF apparatus itself can be reduced, since the space which would be occupied by a number of cables is not needed.

Figure 7:
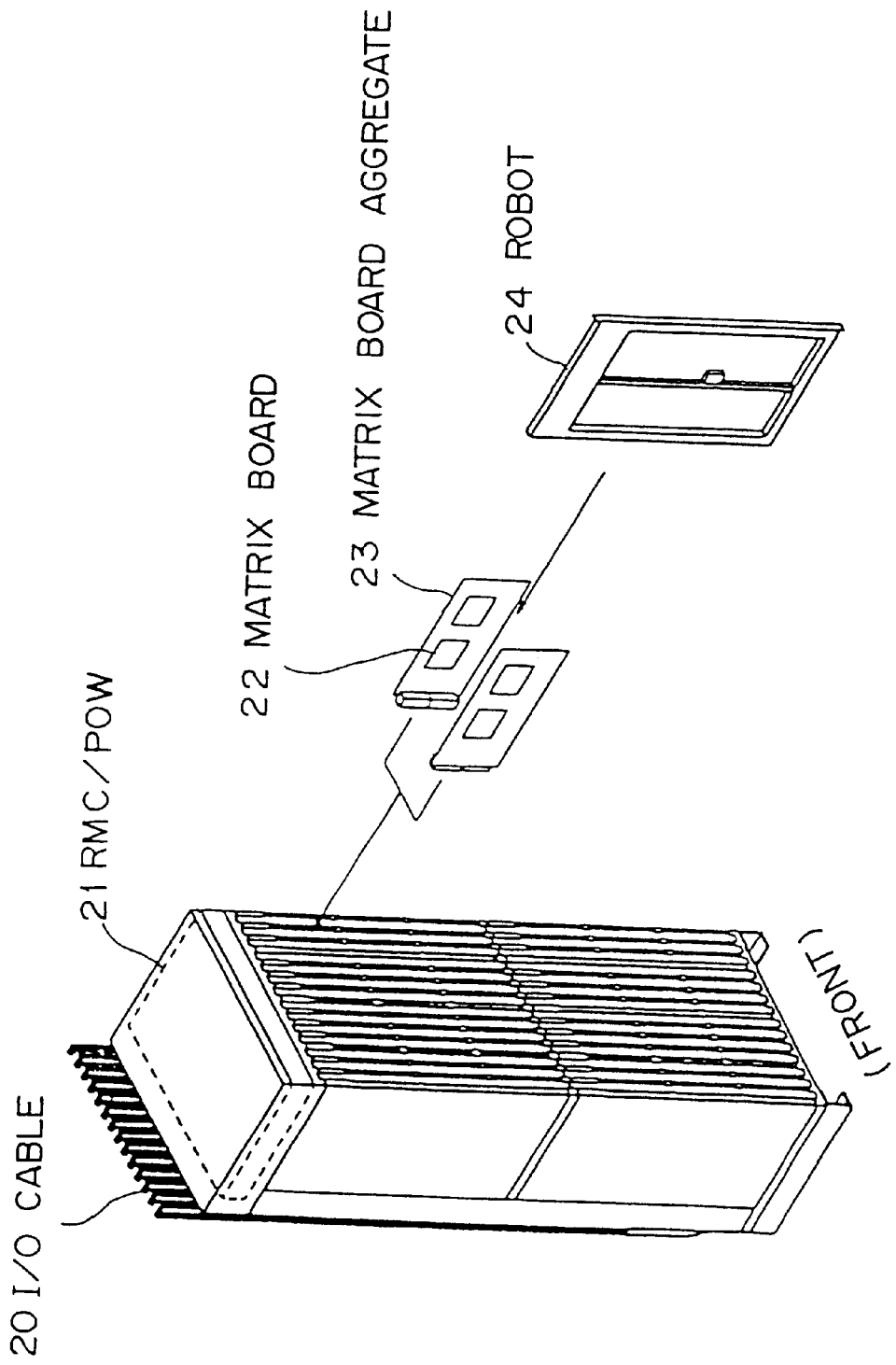
FIG. 7 shows a configuration of an MDF with a switching capacity twice as that of the automatic MDF apparatus shown in FIG. 5.

FIG. 7 shows a configuration of an MDF with a switching capacity twice as that of the automatic MDF apparatus shown in FIG. 5.

The configuration shows the MDF with two stages of upper and lower of matrix board aggregates as shown in FIG. 5. That is, a matrix board aggregate 23 in an upper or a lower stage comprises two matrix boards 22, and three of such matrix board aggregates 23 are arrayed laterally. A robot 24 is the same as that shown in FIG. 5, and one is inserted in each space between the arrayed matrix board aggregates. Between the arrayed matrix board aggregate 23 in the upper stage and those in the lower stage, a shelf-shaped board is provided, which holds the robot 24 inserted in the upper matrix board aggregate. Each of the robots 24 inserted between the arrayed upper and lower matrix board aggregates is controlled by a control circuit/power supply RMC/POW 21 provided on the top of the frame. At the back of the MDF apparatus shown in FIG. 7, lines leading to subscribers and I/O cables 20 for leading to an exchange are connected.

In an automatic MDF apparatus with such a configuration, the following devices are worked out.

Figure 8:
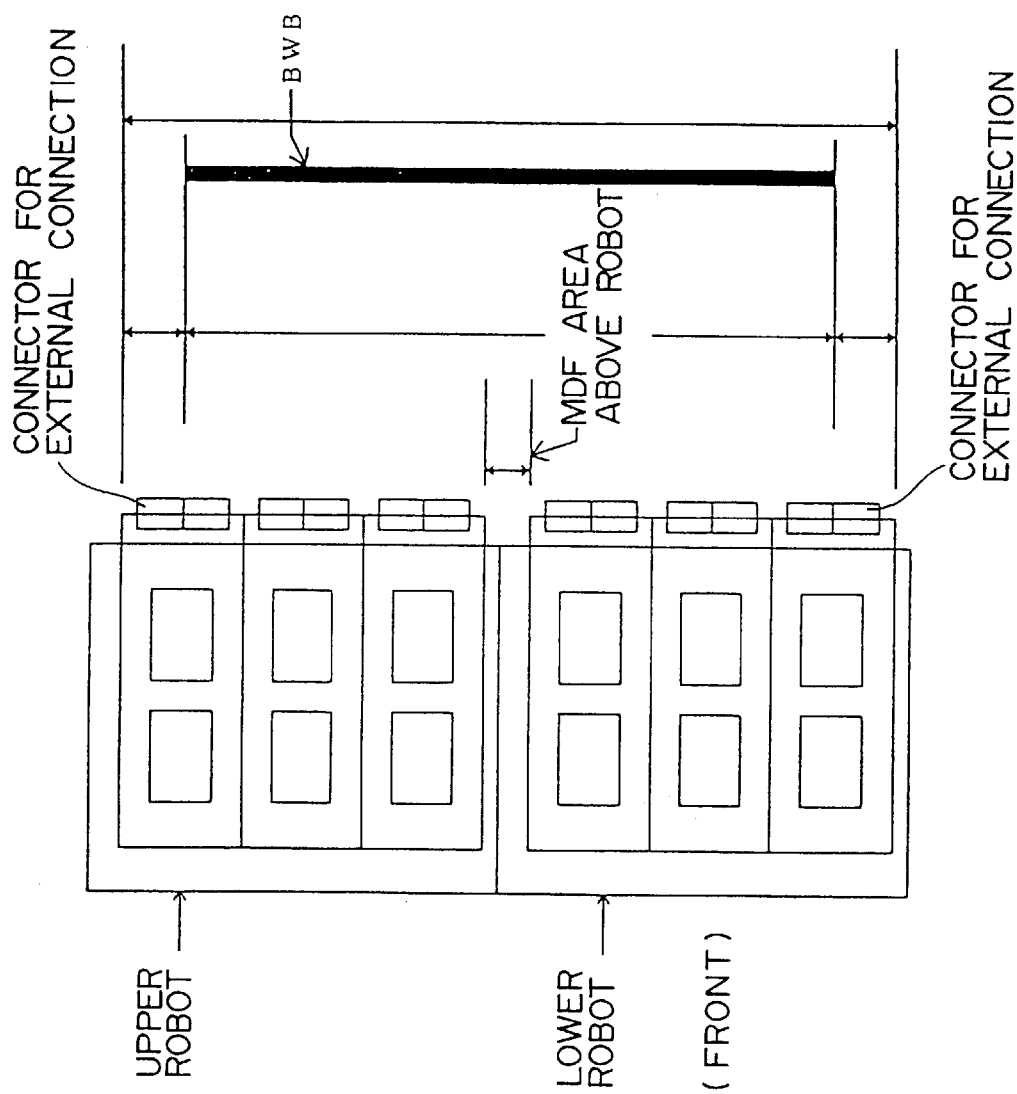
FIG. 8 is a partial side cross-sectional view of the configuration of the automatic MDF apparatus shown in FIG. 7.

FIG. 8 is a partial side cross-sectional view of the configuration of the automatic MDF apparatus shown in FIG. 7.

In the configuration shown in FIG. 7, with two stages, that is, upper and lower stages, of matrix board aggregates as shown in FIG. 5, each of the primary, secondary and tertiary matrix boards are allocated as shown in FIGS. 6A and 6B. By allocating in such a way that the external connectors for the arrayed upper matrix board aggregates and those for the arrayed lower matrix aggregates may be located in the upper and in the lower stages, respectively, the external connectors can be concentrated in the upper and lower stages, as shown in FIG. 8. The upper side and the lower side are vertically symmetrical, and between the upper and lower sides the matrix board aggregates are interconnected. Therefore, the BWB for linking matrix board aggregates is not required to cover all the matrix board aggregates, and it is sufficient for the BWB to be provided only for parts excluding the external connectors both at the top and bottom. Thus, the size of the BWB can be reduced.

Figure 9:
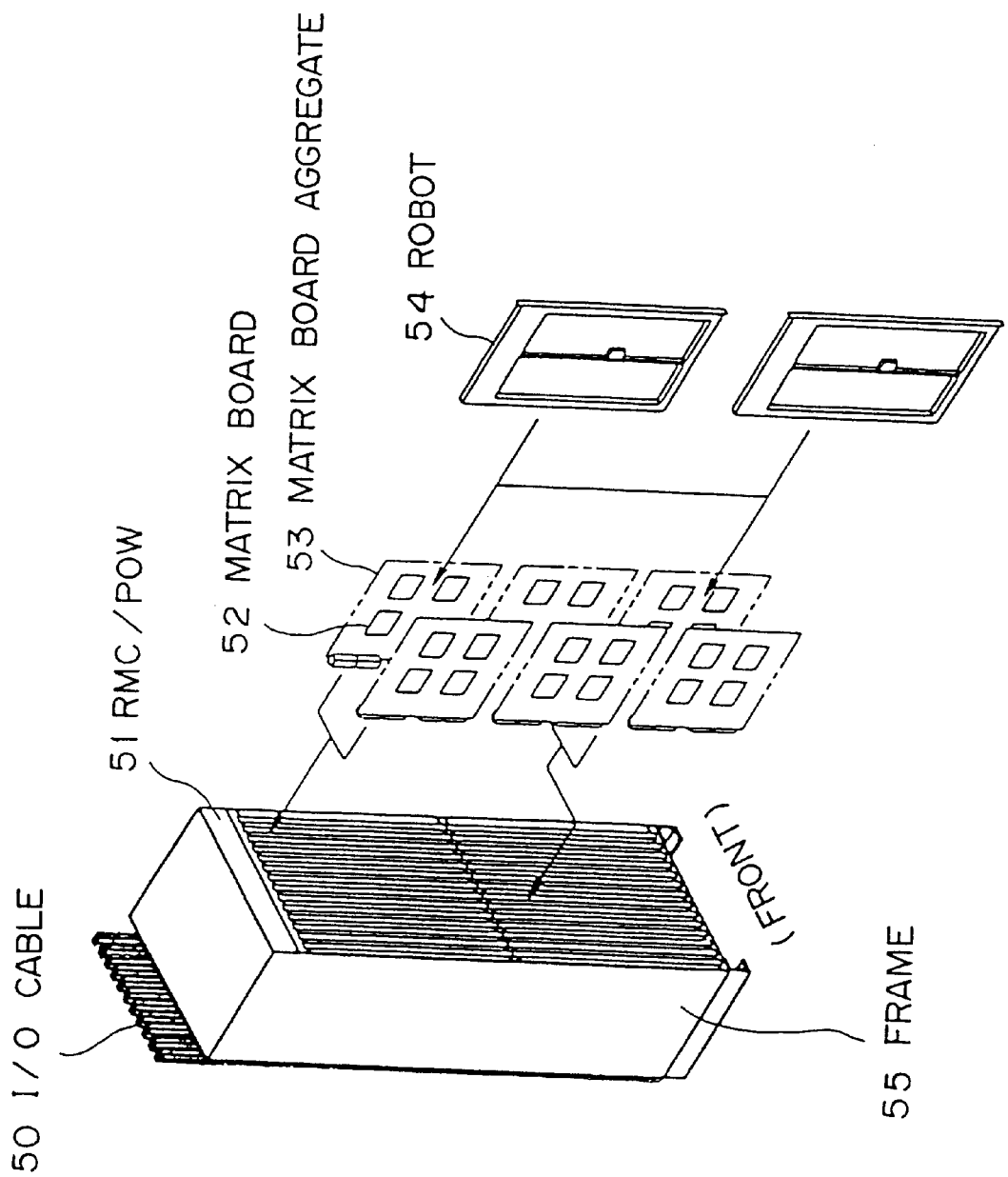
FIG. 9 shows a first variant of the automatic MDF apparatus shown in FIG. 7.

FIG. 9 shows first variant of the automatic MDF apparatus shown in FIG. 7.

In this configuration, a matrix board aggregate 53 comprises four matrix boards 52. In this case, three of the matrix board aggregates 53 are located vertically in a frame 55, and a number of the groups of the three vertically-located matrix board aggregates are laterally arrayed.

Although a robot 54 is the same as that shown in FIG. 5, a board for supporting the upper robot cannot be provided, since the middle matrix board aggregate 53 gets in the way. For this reason, the upper robot is supported by being suspended from the upper portion of the frame 53. In this case, the upper robot 54 handles the switching of both all the matrix boards 52 in the upper matrix board aggregates 53 and the upper half of the matrix boards 52 in the middle matrix board aggregates 53. On the other hand, the lower robot 54 handles the switching of both all the matrix boards 52 in the lower matrix board aggregates 53 and the lower half of the matrix boards 52 in the middle matrix board aggregates 53. Although the upper robot 54 is of a suspended type, the rest of the configuration of the upper robot 54 is the same as that of the lower robot 54. Therefore, the robots 54 can be easily manufactured.

A pair of upper and lower robots 54 are made and are inserted in the space between the laterally-arrayed matrix board aggregates 53. The pair of robots 54 handle the switching of matrix board aggregates 53 located on both sides of the pair of robots 54. The pair of robots 54 are controlled by a control circuit/power supply RMC/POW 51. At the back of a frame 55 I/O cables 50 leading to a line or an exchange as well as a BWB for interconnecting the matrix board aggregates are provided. The I/O cables 50 are configrued to be connected with both the top and the bottom of the frame 55 like the I/O cables described with reference to FIG. 8. Therefore, the size of the BWB for interconnecting matrix board aggregates 53 can be reduced.

In FIG. 9, a configuration where each of all matrix board aggregates accommodates four matrix boards is described. However, in this case, in a three-stage switching configuration, the size of secondary switches becomes large, and a problem often occurs that the size of a matrix board aggregate becomes too large in a configuration where each matrix board aggregate accommodates four matrix boards. In this case, by changing the number of matrix boards accommodated in one matrix board aggregate accommodating a secondary switch, this mounting problem is solved. Therefore, the number of matrix boards accommodated in one matrix board aggregate is not limited to four as shown in FIG. 9, but it can be three, five or an arbitrary integer. The same applies to matrix board aggregates accommodating primary switches or tertiary switches.

Figure 10:
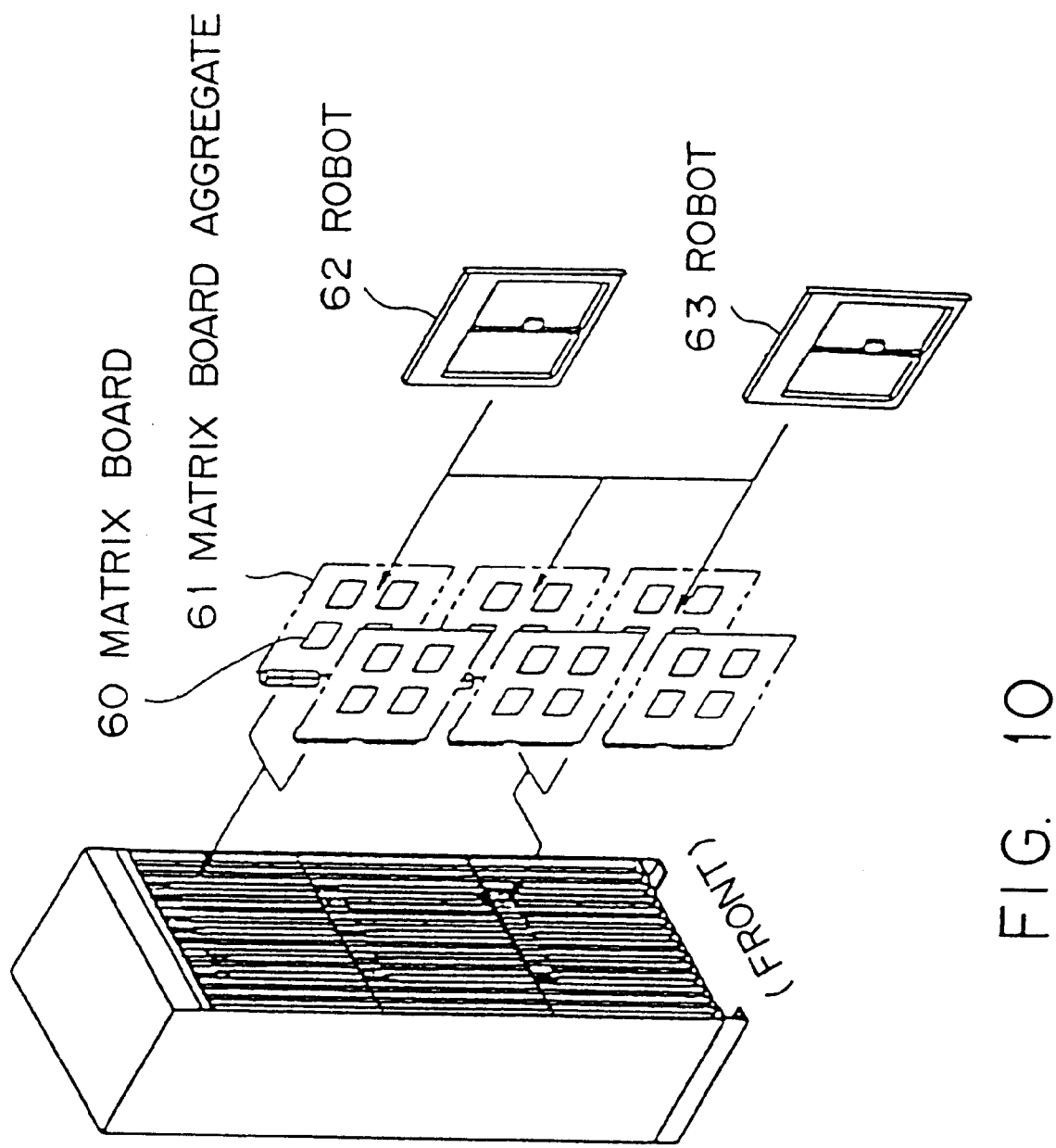
FIG. 10 shows a second variant of the automatic MDF apparatus shown in FIG. 7.

FIG. 10 shows second variant of the automatic MDF apparatus shown in FIG. 7.

In this configuration, a matrix board aggregate 61 comprises four matrix boards 60, and three of the matrix board aggregates 61 are located vertically, which is the same as the configuration shown in FIG. 9. In this second variant, the configuration of robots is different, that is, each of robots 62 and 63 is miniaturized and a pair of robots 62 and 63 correspond to one matrix board aggregate 61. Thus, a robot 62 and a robot 63 are provided corresponding to the top matrix board aggregate 61 and the bottom matrix board aggregate 61, respectively. Furthermore, although not shown in FIG. 10, a robot is provided corresponding to a middle matrix board aggregate. In this case, since space is generated between vertically-arrayed matrix board aggregates 61, a shelf can be provided for the top and bottom of the robots 62 and 63, so they do not need to be suspended. Thus, all robots can be produced with the same configuration. Therefore, although the number of robots increases, the robots can be easily manufactured.

Although not shown in FIG. 10, at the top of a mounting frame, a control circuit/power supply is provided, and at the back of the frame, BWBs and I/O cables are mounted. Methods to connect the BWBs and I/O cables are the same as those shown in FIG. 5.

As described with reference to FIG. 9, the number of matrix boards accommodated in one matrix board aggregate is not limited to four as shown in FIG. 10, but it can be three, five or an arbitrary integer. The same applies to matrix board aggregates accommodating primary switches or tertiary switches.

Figure 11:
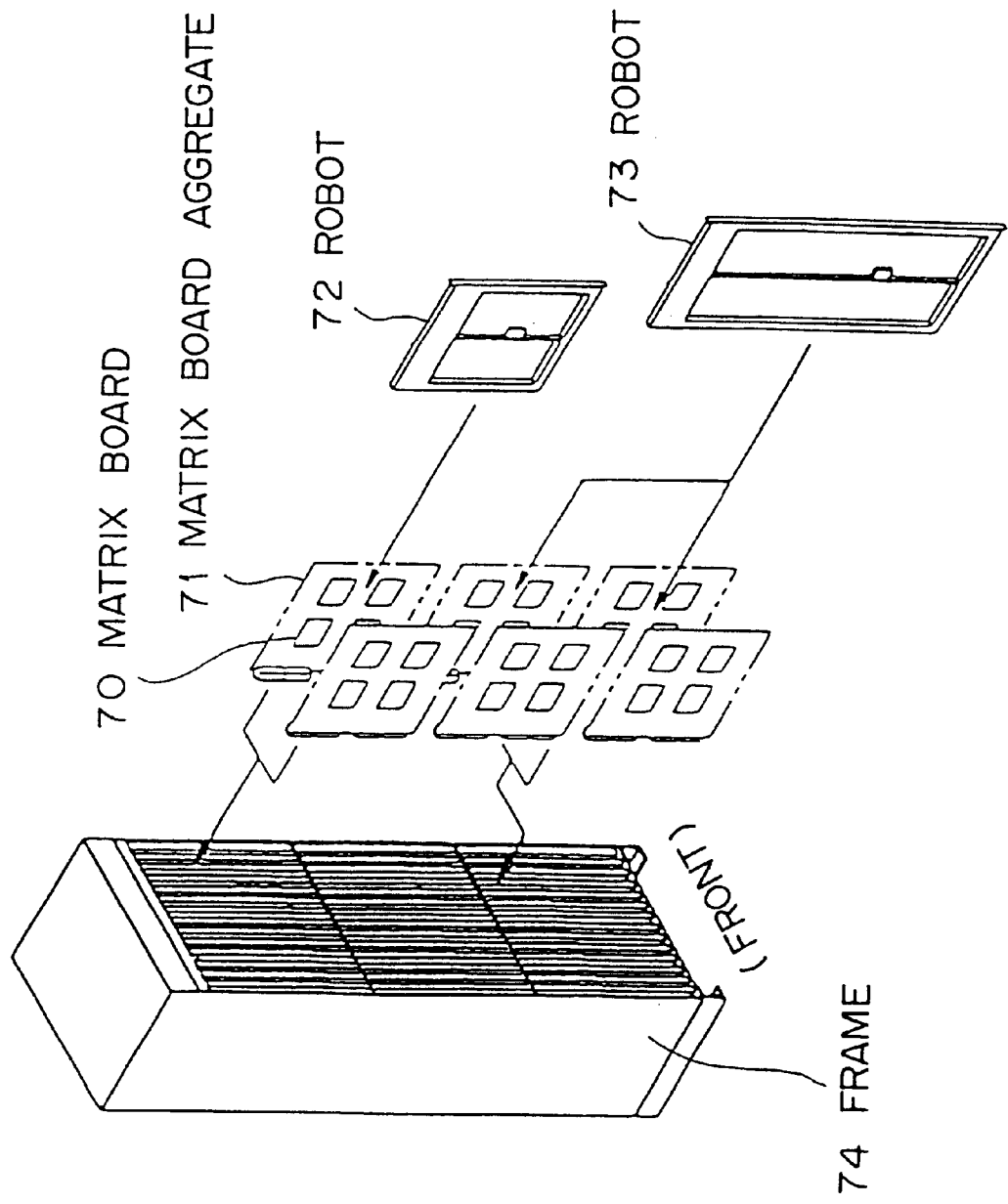
FIG. 11 shows a third variant of the automatic MDF apparatus shown in FIG. 7.

FIG. 11 shows third variant of the automatic MDF apparatus shown in FIG. 7.

In this configuration, the arrayed matrix board aggregates 71 are the same as those shown in FIGS. 9 or 10. That is, one matrix board aggregate 71 comprises four matrix boards 70, and three of such matrix board aggregates 71 are located vertically. Then, groups of matrix board aggregates 71 with three-stage switching configurations are arrayed laterally. In such a configuration, robots are needed to be installed as shown in FIGS. 9 or 10. However, in this preferred embodiment, robots 72 and 73 of different sizes are used to make the mounting easier. The robot 72 is provided to execute the switching process of the top matrix board aggregate 71. This robot 72 is held by a shelf provided in the space between the top matrix board aggregate 71 and a middle matrix board aggregate 71. In this case, since the weight of both the matrix board aggregates 71 and the robot 72 are held by the shelf, the weight can be held without difficulty and the accuracy of devices, such as the operation accuracy of robots, etc. can be secured without difficulty.

On the other hand, switching of the middle and the bottom matrix board aggregates 71 is covered by the robot 73. The robot 73 is a little taller than the robot 72, and handles the switching of both the middle and the bottom matrix board aggregates 71. With such a configuration, although different kinds of robots need to be prepared, the number of robots can be reduced, and simultaneously a special holding method of robots such as suspending is not needed.

Although not shown in FIG. 11, at the top of a frame 74, a control circuit/power supply is provided, which controls the robots 72 and 73. At the back of the frame 74, BWBs are provided and links between the matrix board aggregates are formed, and lines leading to subscribers and I/O cables leading to an exchange are also provided.

As described with reference to FIG. 9, the number of matrix boards accommodated in one matrix board aggregate is not limited to four as shown in FIG. 11, but it can be three, five or an arbitrary integer. The same applies to matrix board aggregates accommodating primary switches or tertiary switches.

FIG. 12 is a cross sectional view showing a configuration to reduce the size of a back wired board used in the configuration shown in FIG. 7.

As shown in FIG. 12, in the configuration shown in FIG. 7, three of matrix board aggregates accommodating two matrix boards each are vertically arrayed. Between two matrix boards for secondary switches, a shelf is provided, where a shelf insertion part for supporting a robot is provided. Although FIG. 8 shows a method of miniaturizing a BWB, in this case, the BWB can be further miniaturized. That is, two upper matrix board aggregates in the upper stage are used for primary switches, the bottom matrix board aggregates in the upper stage and the top matrix board aggregates in the lower stage for secondary switches, and two lower matrix board aggregates in the lower stage for tertiary switches. In this way, interconnections between matrix boards, that is, links, can be classified into two groups; one group is a link between a primary matrix board and a secondary matrix board, and the other group is a link between a secondary matrix board and a tertiary matrix board. Accordingly, BWBs can also be classified into two groups of a BWB for connection between a primary matrix board and a secondary matrix board, and one between a secondary matrix board and a tertiary matrix board. In this way, one BWB can be split into two smaller ones, and an MDF can be configured without using a special large printed wiring board.

Figure 13:
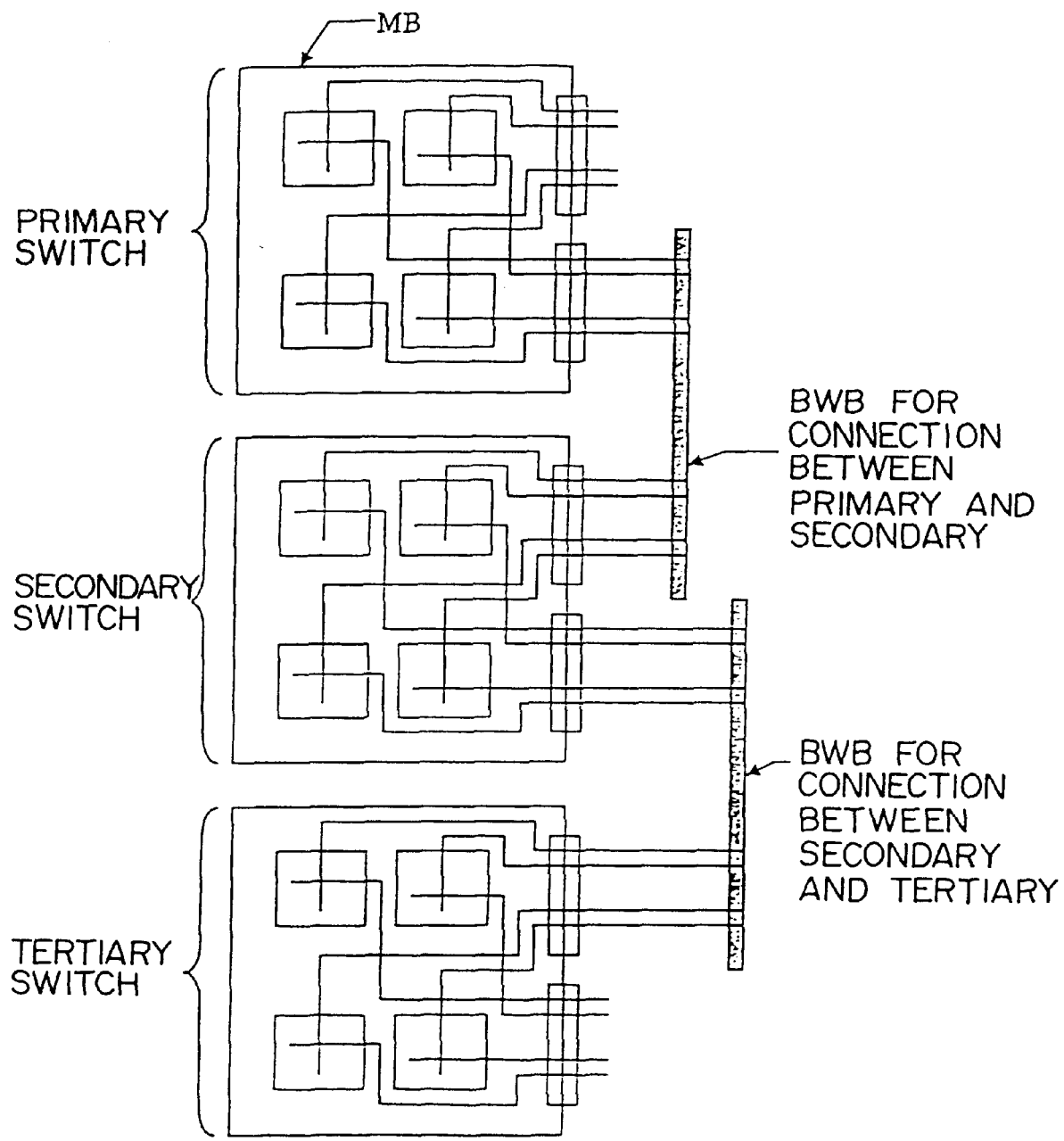
FIG. 13 is a cross sectional view showing a configuration to reduce a size of a back wired board used in the configurations shown in FIGS. 9 through 11.

FIG. 13 is a cross sectional view showing a configuration to reduce the size of a back wired board used in the configurations shown in FIGS. 9 through 11.

In this case, one matrix board aggregate accommodates four matrix boards, and all wiring needed to connect an MDF to outside is concentrated in the upper or lower portion of the MDF by devising suitable wiring in each matrix board aggregate. In a primary matrix board aggregate, wires going to a second matrix board aggregate are accommodated in the lower portion of a board. In the second matrix board aggregate, the wires coming from the primary matrix board aggregate and the wires going to a tertiary matrix board aggregate are accommodated in the upper and lower portions, respectively, of the board. In the same way, in the tertiary matrix board aggregate, the wires coming from the secondary matrix board aggregate are accommodated in the upper portion of the board. Therefore, wires leading to an exchange are accommodated at the bottom portion of the board.

By wiring a board and providing connectors as described above, the size of a BWB for interconnecting primary and secondary matrix board aggregates can be reduced as shown in FIG. 13. In the same way, a BWB for interconnecting secondary and tertiary matrix board aggregates can also be reduced. If BWBs can be reduced in this way, the BWBs can be configured by using printed wiring board of an ordinary size which is readily available, even when a large-scale MDF is required, and thereby a large number of matrix board aggregates can be used. Thus, the cost of an MDF can be reduced, and simultaneously the disadvantages in the case where links are formed using cables, can be solved by using these BWBs.

Figure 14:
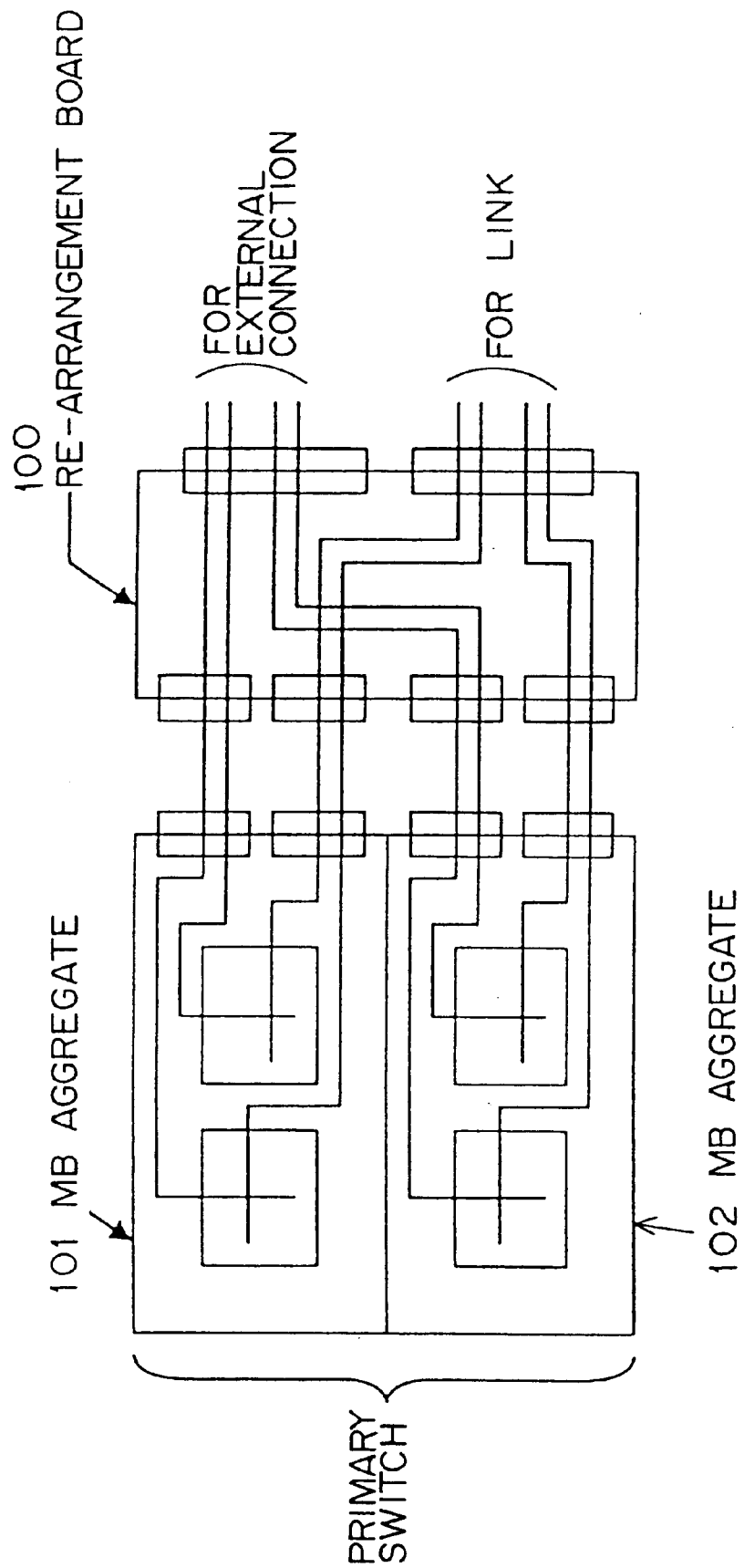
FIG. 14 shows a configuration to obtain the same effect as that in FIG. 9 when switches in each stage are configured by combining two matrix board aggregates accommodating two matrix boards each.

FIG. 14 shows a configuration to obtain the same effect as that in FIG. 9 when switches in each stage are configured by combining two matrix board aggregates accommodating two matrix boards each.

In the configuration shown in FIG. 13, since one matrix board aggregate accommodates four matrix boards, by arranging a wiring in the matrix board, connectors for external connection and connectors for links can be located in an arbitrary position of a board. However, when switches for each stage are configured by combining two matrix board aggregates accommodating only two matrix boards, each of the matrix board aggregates is manufactured separately. Therefore, such an arrangement cannot be made in this case. Under these circumstances, a re-arrangement board 100 is provided to optimally re-arrange wires from each of the matrix board aggregates between wires for external connection and links, like in the case shown in FIG. 9. In the re-arrangement board 100, wires for external connection coming from matrix board aggregates 101 and wires for link are concentrated in the upper and lower portions of the re-arrangement board 100, respectively. On the other hand, out of wires coming from matrix board aggregates 102, wires for external connection and wires for link are concentrated in the upper and lower portions of the re-arrangement board 100, respectively. Thus, the wires can be optimally re-arranged such as when one matrix board aggregate accommodates four matrix boards. Accordingly, the size of BWBs can be reduced, and thereby there is no need for link connection by cables even when an MDF network is large-scaled, which reduces the cost of the apparatus and simultaneously improves the reliability of the apparatus.

Although in FIG. 13 primary switches are shown, the same configuration applies to secondary and tertiary switches by re-arranging wires in the re-arrangement board 100 as shown in FIG. 13. In this case, in a secondary switch, connectors for connection from the primary side and connectors for connection to the tertiary side are concentrated in the upper and lower portions of the re-arrangement board 100, respectively. In the same way, in a tertiary switch, connectors for connection from the secondary side and connectors for external connection to an exchange are concentrated in the upper and lower portions of the re-arrangement board 100, respectively.

Figure 15A:
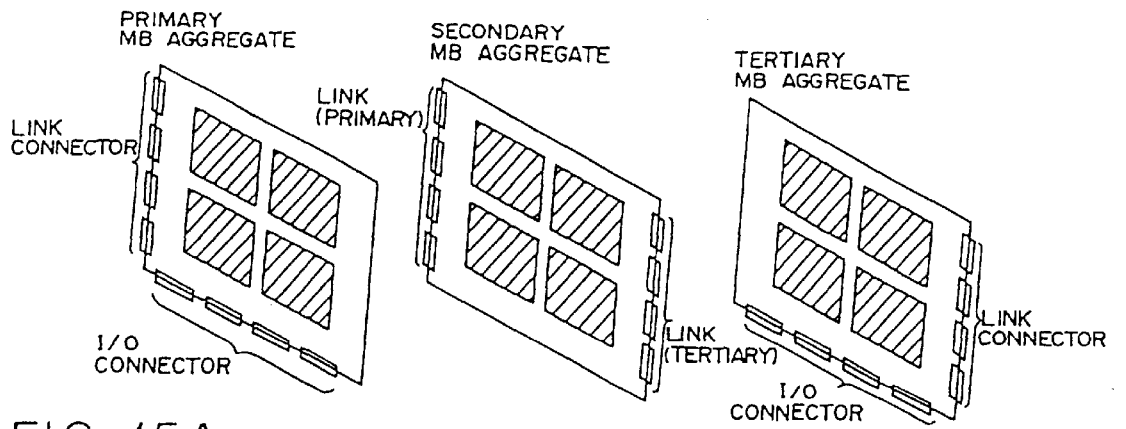
FIGS. 15A and 15B show other configurations of the automatic MDF apparatus of the present invention.
Figure 15B:
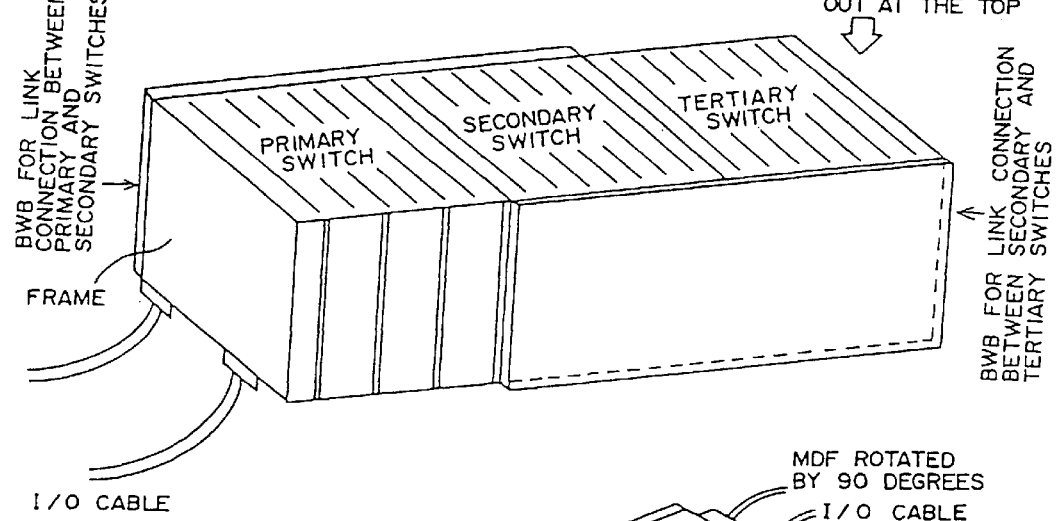
Figure 15B:
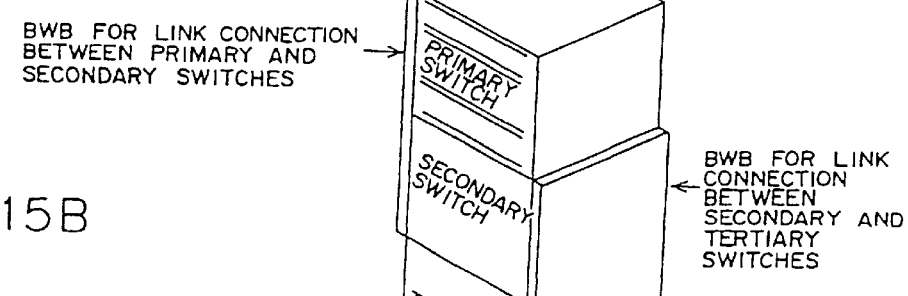

FIGS. 15A and 15B show other configurations of the automatic MDF apparatus of the present invention.

As shown in FIG. 15A, in this preferred embodiment, matrix board aggregates are laterally arrayed, and simultaneously connectors for links and external connection (I/O side) are provided on another side of a matrix board aggregate. Each matrix board aggregate is not vertically arrayed like on a book shelf, but laterally arrayed. Primary matrix boards are provided with link connectors and I/O side connectors on the back and the bottom, respectively, as shown in FIG. 15A. Therefore, I/O cables are led out at the bottom of a frame as shown in FIG. 15A. Primary matrix board aggregates are located from the left to right in order as shown in FIG. 15A, and then in succession secondary matrix board aggregates are located. The secondary matrix board aggregates are provided with link connectors for the primary side and the tertiary side at the back and in the front, respectively, as shown in FIG. 15A. The secondary matrix board aggregates are also located from left to right, and then in succession tertiary matrix board aggregates are located. In the tertiary matrix board aggregates, I/O side connectors and link connectors for the secondary side are provided at the bottom and in the front, respectively, as shown in FIG. 15A. After matrix board aggregates are arrayed in this way, link connection is made. The link connection is made using a BWB. In this case, since link connectors between a primary matrix board aggregate and a secondary matrix board aggregate are provided at the back of a frame as shown in FIG. 15A, the BWB is provided at the back of the frame. On the other hand, since link connectors between secondary matrix board aggregates and tertiary matrix board aggregates are provided in the front as shown in FIG. 15A, a BWB for interconnecting secondary and tertiary matrix board aggregates is provided in the front as shown in FIG. 15A. A robot for performing an automatic switching work is inserted between matrix board aggregates at the top as shown in FIG. 15A.

If sliding type connectors are used for matrix board aggregates, and the connectors are configured to be inserted in and pulled out at the top as shown in FIG. 15A, the switching capacity can be easily changed only by inserting in and pulling out the matrix board aggregates.

In the configuration shown in FIGS. 15A and 15B, although one matrix board aggregate accommodates four matrix boards (indicated by shading), the number of matrix boards accommodated in one matrix board aggregate is not always limited to four, but it can be changed according to the switching capacity of an MDF.

FIG. 15B shows a case where the MDF shown in FIG. 15A is installed and used vertically.

An MDF with the configuration as shown in FIG. 15A is not limited to be used on its side, as shown in FIG. 15A, but it can also be installed and used mounted on a wall, with tertiary switches and primary switches at the bottom and the top, respectively. This way of use is rather preferrable from the viewpoint of maintenance. Of course, the MDF can also be used with primary and tertiary switches at the bottom and the top, respectively. In this case, a control circuit and a power supply for robots are needed to be appropriately located taking into consideration the convenience for maintenance and the stability of the apparatus.

According to the present invention, since when an automatic MDF apparatus is manufactured, interconnection between matrix board aggregates can be made using a BWB made of a printed wiring board, a wrong connection of cables can be avoided, and simultaneously work efficiency can be improved. Since the size of BWBs can also be reduced, interconnection between matrix board aggregates can be made using BWBs even when an automatic MDF apparatus with a largescale network is used, which further improves work efficiency.

Since cables are not used for interconnection between matrix board aggregates, the space which cables would otherwise occupy is not needed. Therefore, the apparatus can be miniaturized and simultaneously simplified.

What is claimed is:

1. An automatic main distribution frame (MDF) apparatus, comprising:
    a plurality of matrix board aggregates which further comprise a plurality of matrix boards including a matrix switch, and are first vertically located and then laterally arrayed;
    a plurality of robots which are provided between the plurality of arrayed matrix board aggregates, for performing switching work for switches of the matrix board aggregates; and
    a back wired board (BWB) made of a printed wiring board, for interconnecting the plurality of matrix board aggregates;
    wherein when a three-stage switching configuration is adopted, and out of switches accommodated in the matrix board aggregate, primary and tertiary switches are located on both sides and in the upper or in the lower of said arrayed matrix board aggregates, and by concentrating secondary switches in the lower center or in the upper center, the size of BWBs for interconnecting matrix board aggregates is reduced.

2. The automatic MDF apparatus according to claim 1, wherein a BWB for connection between a primary side and a secondary side and a BWB for connection between a secondary side and a tertiary side are provided.

3. The automatic MDF apparatus according to claim 2, wherein out of the BWBS, BWBs for connection between a primary side and a secondary side and BWBs for connection between a secondary side and a tertiary side are mounted opposed to each other.

4. The automatic MDF apparatus according to claim 3, wherein out of connectors provided on the matrix board aggregate, connectors for external connection, connectors for connection between a primary switch and secondary switch and connectors for connection between a secondary switch and a tertiary switch are separately mounted on different sides of the matrix board aggregate.

5. The automatic MDF apparatus according to claim 3, wherein matrix board aggregates of the automatic MDF apparatus are used by rotating an arraying direction of the matrix board aggregates by 90 degrees.

6. The automatic MDF apparatus according to claim 1, wherein when two of the automatic MDF apparatuses are combined, a size of BWBs for interconnecting matrix board aggregates is restricted by mounting primary switches and tertiary switches in an upper and lower portion of the automatic MDF apparatuses, respectively, and concentrating connectors leading to subscribers or an exchange in an upper or lower portion of the automatic MDF apparatuses.

7. An automatic main distribution frame (MDF) apparatus, comprising:
    a plurality of matrix board aggregates which further comprise a plurality of matrix boards including a matrix switch, and are first vertically located and then laterally arrayed;
    a plurality of robots which are provided between the plurality of arrayed matrix board aggregates, for performing switching work for switches of the matrix board aggregates; and
    a back wired board (BWB) made of a printed wiring board, for interconnecting the plurality of matrix board aggregates;
    wherein one robot handles one set of matrix board aggregates each on both sides of the robot.

8. An automatic main distribution frame (MDF) apparatus, comprising:
    a plurality of matrix board aggregates which further comprise a plurality of matrix boards including a matrix switch, and are first vertically located and then laterally arrayed;
    a plurality of robots which are provided between the plurality of arrayed matrix board aggregates, for performing switching work for switches of the matrix board aggregates; and
    a back wired board (BWB) made of a printed wiring board, for interconnecting the plurality of matrix board aggregates;
    wherein one robot handles one and a half sets of matrix board aggregates each on both sides of the robot.

9. An automatic main distribution frame (MDF) apparatus, comprising:
    a plurality of matrix board aggregates which further comprise a plurality of matrix boards including a matrix switch, and are first vertically located and then laterally arrayed;
    a plurality of robots which are provided between the plurality of arrayed matrix board aggregates, for performing switching work for switches of the matrix board aggregates; and
    a back wired board (BWB) made of a printed wiring board, for interconnecting the plurality of matrix board aggregates;
    wherein a first kind of robot handles a set of matrix board aggregates each on both sides of the robot, and a second kind of robot handles two sets of matrix board aggregates each on both sides of the robot.

10. An automatic main distribution frame (MDF) apparatus, comprising:
    a plurality of matrix board aggregates which further comprise a plurality of matrix boards including a matrix switch, and are first vertically located and then laterally arrayed;
    a plurality of robots which are provided between the plurality of arrayed matrix board aggregates, for performing switching work for switches of the matrix board aggregates;

a back wired board (BWB) made of a printed wiring board, for interconnecting the plurality of matrix board aggregates;

a re-arrangement board where, in a configuration where each of the matrix board aggregates comprises two matrix boards, out of wires coming from the matrix board aggregates, wires for external connection, wires for interconnection between a primary switch and a secondary switch and wires for interconnection between a secondary switch and tertiary switch are separately concentrated and located in units of two matrix board aggregates.

* * * * *